Patented Mar. 11, 1952

2,589,069

UNITED STATES PATENT OFFICE 2,589,069

MAKING RESINS FROM OLEFIN POLYMERS AND ORGANIC ACID ANHYDRIDE

Egi V. Fasce, Baton Rouge, La., assignor to Standard Oil Development Company, a corporation of Delaware No Drawing. Application June 4, 1948, Serial No. 31,202

5 Claims. (Cl. 260—78.5)

This invention relates to high molecular weight polymers, relates especially to methods for coupling polymer molecules and relates particularly to methods for coupling unsaturated polymer molecules by means of acid anhydrides.

In the preparation of ethyl chloride by the reaction between hydrogen chloride and ethylene, the respective gases are bubbled through and dissolved in ethyl chloride under pressures ranging from atmospheric pressure to 250 lbs. per square inch; and at temperatures within the range between 0° F. and 200° F., the preferred ranges being from 100 lbs. to 250 lbs. per square inch at temperatures within the range between 50° F. and 150° F. The reaction is promoted by the presence of aluminum chloride which is added to the material in the reactor to the extent of from 0.5% to 3% of aluminum chloride (based on the amount of ethyl chloride solvent in the reactor). In the presence of the aluminum chloride, the hydrogen chloride and ethylene, in solution, react to yield the desired ethyl chloride which is liquid within the stated conditions of temperature and pressure. Small amounts of hydrogen chloride and ethylene may fail to combine, and they are discharged from the top of the reactor and an overflow stream of liquid ethyl chloride is also discharged from the reactor. The presence of unreacted ethylene and hydrogen chloride makes necessary a subsequent purification step to obtain commercially pure ethyl chloride. A water-wash followed by distillation over caustic such as lime or soda or sodium hydroxide may be employed. It is found however that there are also side reactions in this polymerization process which produce considerable amounts of higher molecular weight material than the ethyl chloride; this higher molecular weight material usually containing from 1% to 5% or 10% of chlorine and being relatively highly unsaturated. On the basis of such factors as refractive-index, bromine number, boiling point and gravity it appears that the major portion of this material is cyclic or naphthalenic in nature but contains some small amounts of paraffins and diolefins. It further appears that the diolefins are cyclic in character rather than srtaight chain diolefins.

The liquid overflow from the reactor, which is 90% or more ethyl chloride, with the remainder mostly these heavier unsaturated polymers is then taken to a separator step or process which may consist in a preliminary water-wash to remove any uncombined hydrogen chloride or may consist primarily of a treatment in the fractionating still in which substantial quantities of caustic soda or lime or the like are used. This treatment involves the use of a fractionating column still in which the ethyl chloride in a condition of high purity is taken overhead from the still, recondensed and run into suitable containers for sale and shipment. The still bottoms consist, as above indicated, of a series of polymers of a relatively wide range of molecular weight, which are more or less highly unsaturated in character with boiling points falling in a relatively wide temperature range from about 137° F., up, there usually being a portion not volatile at any temperature and vacuum, without heat breakdown. The lower boiling components of the still bottoms are clear and closely resemble naphtha, although the bromine number is much higher, indicating a relatively highly unsaturated material. Higher boiling portions also are highly unsaturated, and show increasingly deeper color characteristics. The non-volatile portion is a sticky, dark colored, tarry material.

According to the present invention it is now found that certain intermediate boiling portions of this material, particularly the intermediate boiling material having a boiling point within the range between 500° F. and 525° F. can be, in large part, converted to a highly useful solid polymer of good strength, high melting point and substantial commercial value by the steps of reacting the polymer with an acid anhydride such as maleic anhydride, citraconic anhydride and the other alkyl substituted maleic anhydrides can also be used for this reaction. These anhydrides and a wide range of other anhydrides such as phthalic anhydride may be used to react with the polymer cut of the desired boiling point to produce the desired valuable hard resin, through the agency of aluminum chloride or other Friedel-Crafts catalyst.

It may be noted that the lower boiling portions of the still bottoms, while they are reactive with maleic anhydride may not yield a hard resin and accordingly it is desirable for the purposes of this invention to use only the higher boiling material.

Thus the process of the invention reacts together a highly unsaturated ethylenic polymer with an acid anhydride in the presence of a Friedel-Crafts catalyst to produce a hard, moderately high melting resin. Other objects and details of the invention will be apparent from the following description:

In practicing the invention, the polymer residue from the purification of the ethyl chloride, prepared by the interaction between hydrogen chloride and ethylene as above outlined is treated with warm water at a temperature between about 60° and 120° F. to hydrolyze any residual chlorides present; stirring the polymer residue vigorously with the warm water. The material is then allowed to settle, and lighter polymer decanted from the wash water. This polymer is then dried over anhydrous sodium carbonate and filtered. The polymer material is then charged to a still and a series of distillation cuts taken overhead. Approximately two-thirds of the polymer is distillable. Approximately 15% by volume distills within a temperature range between 137° F. and 400° F. Approximately 21% distills over a temperature range from 410° F. to 550° F. and approximately 9% distills over a temperature range between 410° F. and 667° F. Approximately 21% is distillable by the use of steam and vacuum, leaving a nonvolatile residue of approximately 34% by volume.

It may be noted that the first cut, 15%, distilled out over the normal boiling range for gasoline; the second cut boiled over the normal range for white signal oil; the third cut over the normal boiling range for gas oil, and the fourth cut over the normal boiling range for a lubricating oil. For the purposes of this invention, the second and third cuts were combined and redistilled to obtain approximately 9% by volume of the total polymer, boiling over a temperature range between approximately 500° F. and 525° F. with a midpoint at 515° F. (corresponding to a cut at 220° F. under a 4 mm. vacuum). The remainder of the material was returned to the process for other purposes. The polymer material, boiling between 500° F. and 525° F., appeared to consist almost entirely of $C_{14}$, $C_{15}$, and $C_{16}$ compounds with small amounts only of $C_{13}$ and $C_{17}$ compounds.

This polymer cut from the polymerized residue obtained from the reaction in the making of ethyl chloride is the preferred material for present invention. The invention is not however limited to this particular cut. The lighter boiling fractions which also have reasonably high iodine numbers also react excellently with the maleic anhydride. They do not however produce hard resins. The product obtained by the use of these lower boiling temperature components tends to be of undesirable low melting point to the extent of being in some instances practically fluid or heavy lubricating oil-like material. Similarly, materials boiling at higher temperatures than the indicated range are usable but not so readily, since they tend to have undesirably low iodine numbers and it is difficult to separate the high molecular weight relatively low unsaturated materials from the resin which is produced. Accordingly for the purposes of the present invention it is highly desirable to utilize only the material boiling within this rather narrow temperature range. The preferred polymer having a boiling point within the stated range of 500° F. to 525° F. is then mixed with an approximately equal amount of maleic anhydride (or other anhydride) and with approximately 10% of aluminum chloride and the mixture heated to a temperature within the range between about 150° to 250° F. with vigorous stirring. The initial color of the cut is a light yellow, and within 10 minutes after the beginning of the heat treatment, the color of the mixture changes from light yellow to bluish green which darkens somewhat on continuing heating. The heating is then continued for 1 hour. At the end of this time, the mixture is hydrolyzed with dilute (10%) hydrochloric acid to decompose the aluminum chloride and the resulting hydrocarbon layer is extracted with chloroform. The chloroform extract is washed with water, dried over sodium carbonate, and filtered. The chloroform is then distilled off and there is obtained approximately 120% (based on polymer feed) of a dark brownish oil.

This material is separated into components consisting of a substantial amount of a heavy, dark, tarry oil, and solid light yellow resin.

It may be noted that the unsaturation in these compounds is relatively high, being measured by iodine numbers usually in the neighborhood of about 80, although various cuts show varying iodine numbers within the range between about 60 and about 90, the overall range usually being found to lie between 50 and 110. It may be noted that any of these polymers having from $C_{14}$ to $C_{18}$ carbon numbers with iodine numbers within the stated range are more or less effectively usable for the present invention.

For this separation of the reaction product from the polymer and anhydride in the presence of the aluminum chloride, the mixture is dissolved in hot alcohol, preferably hot ethyl alcohol, boiled with Norite (charcoal) as a decolorizer, for a few minutes and then filtered. The clear filtrate is evaporated to dryness and then petroleum ether added to precipitate the resin. Upon filtration, a light yellow solid resin is obtained, the yield being approximately 36% based upon the polymer cut utilized in the original polymerization. Upon the evaporation of the filtrate to remove the solvent, there is obtained approximately 64% based on polymer feed of a liquid red, viscous, oily resin. It may be noted that these indicated yields are approximations only because of the unavoidable losses in handling and unavoidable losses from the solvents used. An additional yield, a further portion of the resin, may be obtained by re-dissolving the oil in petroleum ether. This dissolves only a portion of the material, and the resin itself remains separate and undissolved. By this procedure approximately 50% yield of resin on the amount of feed initially used is obtained.

This resin is found to be partially soluble in hot alkali solution, readily soluble in ethyl alcohol and chloroform and insoluble in water and also relatively quite insoluble in hydrocarbon solvents as such. In general the resin is readily soluble in the oxygenated solvents and quite insoluble in the hydrocarbon type solvents. The melting point is not necessarily uniform, depending in large measure upon the care with which the accompanying heavy oil is removed. By appropriate treatment, a resin having a melting point ranging from approximately 100° F. to about 150° F. is readily obtained.

This resin is particularly useful as a tackiness agent especially in connection with the compounding of both crude and synthetic rubber. Its relatively low iodine number makes it highly valuable in both the conjugated diolefin-styrene and conjugated diolefin-nitrile type synthetic rubbers, the low unsaturation olefin-diolefin synthetic rubber as well as natural rubber, in all of which it improves the tackiness and simplifies, facilitates and eases the problems involved in the building of tires and tubes. Likewise, it is useful as a drying oil; and as a filler in paints. It may be added in linseed oil or other drying oils which may then be cooked in the usual fashion to yield an excellent paint base or varnish base.

It is also valuable as a component in a molding composition in which it may be used as such, alone, but preferably with fillers such as cotton linters, ground wood, ground cork, various pigments such as rouge, chrome green, chrome yellow, barites, whiting and the like. Alternatively the resin of the present invention may be used as a filler or compounding agent with other resins such as the bakelite resins, glyptal resins and the other molded composition resins in general.

The above outline shows the making of but one type of polymer. Similar polymers are readily produced from other anhydrides as mentioned, citraconic anhydrides being particularly useful, that is, tests to the present have shown that any of the known anhydrides are usable more or less advantageously for the present invention.

Also, the above disclosure shows polymer from but one source. The invention is not however, limited to this source alone, since it is possible to produce a polymer from ethylene as such, with or without a diluent, in the presence of aluminum chloride, usually with a solvent such as ethyl or methyl chloride or carbon di-sulfide or the like for the aluminum chloride. This reaction proceeds excellently, especially at reduced temperatures or under elevated pressure as desired and it produces an excellent polymer which also shows a fairly wide boiling range and molecular weight; which is conveniently fractionated as above described to obtain the specified narrow cut.

A similar polymer is obtainable from propylene which is particularly advantageous for use in this invention. Propylene may be used as such, being added to a solution of aluminum chloride or the like in an appropriate solvent. In some instances, particularly advantageous polymers are obtainable from propylene by the use of aluminum bromide in solution in a hydrocarbon solvent, and this is especially true when relatively high concentrations of aluminum bromide are used, although the reaction tends to proceed somewhat more slowly than with aluminum chloride.

A considerable number of mixed polymers are produced from such sources as mixtures of ethylene and propylene or mixtures of ethylene, propylene, and butylene or the like, which also are very useful for this invention.

A particularly useful mixture is the C₄ cut residue from which isobutylene has been extracted. This residue contains portions of ethylene, propylene and normal butenes and a small amount of the pentenes and sometimes the hexenes. This polymer, produced by the use of a solid catalyst or by a dissolved catalyst shows excellent properties for use in the present invention. In each instance the preferred catalyst is aluminum chloride in solution in ethyl chloride. However, a wide range of other Friedel-Crafts type catalysts may be used as desired, including such substances as boron tri-fluoride, titanium tetra-chloride, uranium chloride and the like, substantially any of the Friedel-Crafts type of catalysts, being efficiently and effectively used.

Thus the process of the invention reacts together a highly unsaturated hydrocarbon polymer with an acid anhydride to produce a light colored resin of good melting point.

While there are above disclosed but a limited number of embodiments of the invention, it is possible to produce still other embodiments without departing from the inventive concept herein disclosed and it is therefore desired that only such limitations be imposed on the appended claims as are stated therein or required by the prior art.

The invention claimed is:

1. The process for preparing a light colored hard resin from an oily olefin polymer having a boiling range of about 500–525° F. and an iodine number of about 50 to 110, said polymer containing a major proportion of cyclic constituents and containing at least some cyclic diolefins, and consisting essentially of compounds having 14 to 16 carbon atoms, which comprises reacting said polymer with a dibasic organic acid anhydride in the presence of aluminum chloride at a temperature of about 150–250° F., and separating from the resulting reaction products a portion consisting of a hard light-colored resin having a melting point of about 100–150° F.

2. A process for preparing a light-colored hard resin from an oily olefin polymer obtained as a by-product during the manufacture of ethyl chloride by reacting ethylene and hydrogen chloride at a temperature of about 50–150° F. and under a pressure of about 100–250 lbs./sq. in., the crude by-product polymer being fractionated to separate a fraction boiling at about 500–525° F., consisting essentially of compounds having 14 to 16 carbon atoms per molecule, having an iodine number of about 50–110, and containing a small amount of chlorine in the range of about 1 to 10%, said polymer fraction consisting in major proportion of cyclic compounds and containing at least some cyclic diolefins, comprising reacting said separated polymer fraction with a dibasic organic acid anhydride in the presence of aluminum chloride at a temperature of 150–250° F., and separating from the resulting higher molecular weight polymer reaction products a portion consisting essentially of a hard light-colored resin.

3. Process according to claim 2 in which the separated polymer fraction used as raw material for reaction with the organic acid anhydride has a mid boiling point of about 515° F. and has an iodine number of about 60–90, and said fraction is reacted in about equal amounts with maleic anhydride in the presence of about 10% of aluminum chloride, and in which the hard resin separated from the reaction products has a melting point of about 100–150° F., is soluble in hot alkali, ethyl alcohol, chloroform and in oxygenated solvents in general, but is substantially insoluble in petroleum ether and other hydrocarbon solvents.

4. A product consisting essentially of a hard light colored resin having a melting point of about 100–150° F., soluble in ethyl alcohol, chloroform, oxygenated solvents and in hot alkali but substantially insoluble in petroleum ether and other hydrocarbon solvents, said resin being a reaction product of a dibasic organic acid anhydride with an oily olefin polymer fraction having a boiling range of about 500–525° F., an iodine number of about 50–110, a small chlorine content in the range of about 1 to 10%, and consisting essentially of compounds having 14 to 16 carbon atoms and consisting in major proportion of cyclic compounds including at least some cyclic diolefins, said reaction product having been prepared in the presence of aluminum chloride at a temperature of from 150 to 250° F.

5. Product consisting essentially of a hard light colored resin having a melting point of about 100–150° F., soluble in ethyl alcohol, chloroform, oxygenated solvents, and in hot alkali, but substantially insoluble in petroleum ether and other hydrocarbon solvents, said resin having been produced by reaction of about equal amounts of maleic anhydride and an oily olefin polymer fraction boiling at about 500–525° F., having an iodine number of about 60–90, consisting essentially of compounds having 14 to 16 carbon atoms and containing a major proportion of cyclic compounds including at least some cyclic diolefins, said reaction having been carried out at about 150–250° F. in the presence of about 10% of aluminum chloride, and said hard light colored resin having been separated from the reaction products by precipitation with petroleum ether.

EGI V. FASCE.

REFERENCES CITED

The following references are of record in the file of this patent:

UNITED STATES PATENTS

| Number | Name | Date |
|---|---|---|
| 2,133,734 | Moser | Oct. 18, 1938 |
| 2,142,980 | Huijser et al. | Jan. 3, 1939 |
| 2,147,547 | Reiff et al. | Feb. 14, 1939 |
| 2,201,750 | Vierling et al. | May 21, 1940 |
| 2,429,479 | Mikeska | Oct. 21, 1947 |